US012453920B2

(12) United States Patent
Abrahamson

(10) Patent No.: US 12,453,920 B2
(45) Date of Patent: *Oct. 28, 2025

(54) BACCARAT PROGRESSIVE SYSTEM

(71) Applicant: Golden Tie, LLC, Las Vegas, NV (US)

(72) Inventor: Jamie Abrahamson, Las Vegas, NV (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/106,705

(22) Filed: Feb. 7, 2023

(65) Prior Publication Data

US 2023/0256321 A1 Aug. 17, 2023

Related U.S. Application Data

(63) Continuation of application No. 17/210,438, filed on Mar. 23, 2021, now Pat. No. 11,571,614, which is a continuation of application No. 15/157,518, filed on May 18, 2016, now Pat. No. 10,953,311.

(60) Provisional application No. 62/280,115, filed on Jan. 18, 2016.

(51) Int. Cl.
*A63F 1/00* (2006.01)
*G07C 15/00* (2006.01)

(52) U.S. Cl.
CPC .............. *A63F 1/00* (2013.01); *G07C 15/006* (2013.01); *A63F 2001/001* (2013.01)

(58) Field of Classification Search
CPC .... A63F 1/00; A63F 2001/001; G07C 15/006
See application file for complete search history.

(56) References Cited

U.S. PATENT DOCUMENTS

| | | | | |
|---|---|---|---|---|
| 4,861,041 A * | 8/1989 | Jones | A63F 3/00157 | 273/309 |
| 2010/0025931 A1* | 2/2010 | Walker | A63F 3/00157 | 273/292 |
| 2016/0101347 A1* | 4/2016 | Merati | A63F 1/18 | 463/16 |
| 2017/0140604 A1* | 5/2017 | Litman | G07F 17/3293 | |

* cited by examiner

*Primary Examiner* — Michael D Dennis
(74) *Attorney, Agent, or Firm* — Newman Law, LLC

(57) ABSTRACT

A system enables a method of executing a game of baccarat with a side bet event. The system includes a gaming table with at least two distinct player positions. The gaming table having positions thereon for placing an initial wager on the game of baccarat and for placing a second wager on the side bet event from at least one of at least two player positions at the gaming table on the game of baccarat, the side bet resolved by final playing cards at the player hand position and the banker hand position. Each of the at least two player positions has a secondary random outcome indicator display. The gaming table has a random event generator providing distinct random event outcome indicators to the secondary random outcome indicator displays at each player position and each distinct random event outcome indicator represents a single digit number value.

13 Claims, 1 Drawing Sheet

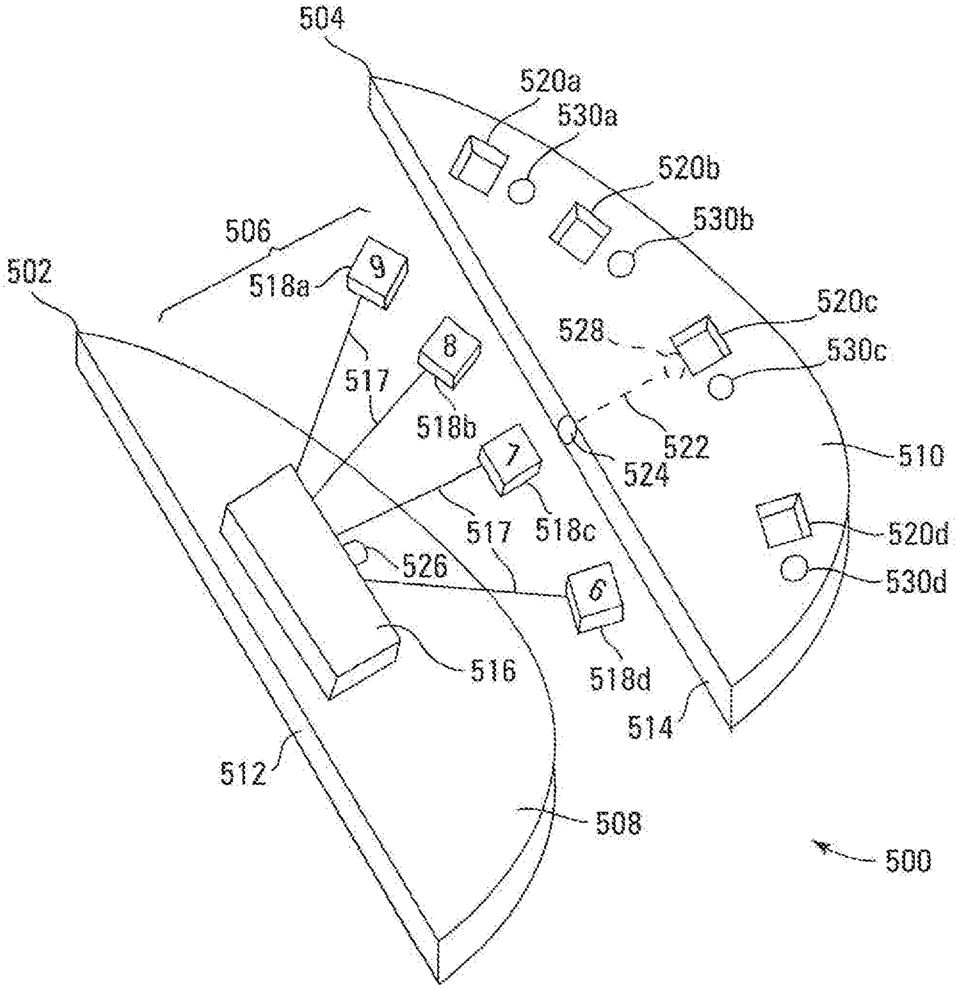
504
520a
530a
520b
530b
506
502
518a
9
8
517
520c
528
530c
518b
522
510
524
7
517
518c
526
520d
530d
6
516
518d
514
512
508
500

BACCARAT PROGRESSIVE SYSTEM

RELATED APPLICATION DATA

This application claims priority from U.S. Provisional Patent Application Ser. No. 62/280,115, filed 18 Jan. 2016, and Titled BACCARAT PROGRESSIVE SYSTEM, which application is incorporate herein by reference in its entirety.

BACKGROUND OF THE INVENTION

1. Field of the Invention

The present invention relates to the field of wagering events, wagering events involving the wagering event of baccarat, and especially jackpot events used in combination with baccarat.

2. Background of the Art

Baccarat is one of the many live table games played in casinos or gaming establishments. Baccarat uses a standard deck of 52 playing cards and is usually dealt from a shoe having multiple decks that have been shuffled together prior to the beginning of play.

The object of the game of Baccarat is for the bettor to successfully wager on whether the Banker's hand or the Player's hand is going to win. The bettor receives even money for his wager if he selects the winning hand and loses his wager if he selects the losing hand. Because of the rules of play of Baccarat and more particularly the pre-established draw rules, the Banker's hand has a slightly higher chance of winning than does the Player's hand. The winning frequency for the Banker's hand has been determined to be 0.45859 (45.859%) whereas the winning frequency for the Player hand is 0.44624 (44.624%) with the remainder of the outcomes being ties. Therefore, if the bettor wagers on the Banker's hand and the Banker hand wins, the bettor must pay to the gaming establishment a commission (typically, 5%) of the amount the bettor wins. No commission is paid if the bettor successfully wagers on the Player's hand.

As used in this specification, the term "Conventional Manner of Play of Baccarat" is as follows:

A multiple number of decks of standard playing cards, 52 in number, are used; typically eight decks are shuffled together and placed in a shoe from which the cards are dealt during the play of the game.

Each bettor makes a wager on whether the Banker's hand or the Player's hand will win. After all wagers are made, two cards are dealt from the shoe to the Banker position and two cards are dealt from the shoe to the Player position on the table layout. The cards are turned face up and the value of the Banker hand and the Player hand is determined, modulo ten.

Aces count one; Kings, Queens, Jacks and Tens count zero and the other cards count their respective face value. The suits (Spades, Hearts, Diamonds and Clubs) have no meaning in Baccarat.

The highest hand value in Baccarat is nine. All hand values range from a low of zero to a high of nine. If when the cards are added together, the total of the hand exceeds nine, then the hand value is determined modulo ten. For example, a seven and an eight total fifteen, but the hand value is five. An Ace and a nine total ten, but the hand value is zero.

A two card total of eight or nine is called a "natural"; a two card total of zero is called a "baccarat." As will be explained below, in certain situations in the play of the game, a third card will be dealt. The value of this third card is added to the total of the first two cards and a new hand value is established. Again, if the new hand total exceeds nine, the hand value is determined by subtracting ten from the total of the hand.

Prior to the deal, each bettor can make one of three wagers: 1) that the Banker hand will win; 2) that the Player hand will win; or 3) that the Banker hand and the Player hand will tie. Wagering locations are provided on the Baccarat table layout. Whichever of the Banker hand or the Player hand is closest to a total on nine is the winner.

All winning Banker hand wagers are paid off at odds of one-to-one and the house charges a five percent (5%) commission on the amount won by the bettor. For example, if a bettor wagers $100 on the Banker hand and the Banker hand wins, the bettor wins $100 and is charged a $5 commission on the amount that the bettor won. The bettor is not charged any commission on the amount of his wager.

All winning Player hand wagers are paid off at odds of one-to-one and the bettor is not charged any commission on the amount of his winnings or his wager because the house, by virtue of the third card draw rules, has a statistical advantage over the player of 45.859−44.624 or 1.235% which is the vigorish ("vig") of the house on player wagers. Winning wagers on the Tie hand bet are paid off at odds of nine-to-one or eight-to-one (depending on the gaming establishment) and the bettor is not charged any commission on the amount of his winnings or his wager since there is already a statistical advantage in favor of the house on tie wagers. If a Tie hand occurs, all wagers on the Banker hand and all wagers on the Player hand are "pushes" and the amount wagered is returned to the bettor.

Depending on the point total of the Player's hand and the Banker's hand, one more card may be dealt to either the Player's hand, the Banker's hand or both. The rules for determining whether a third card is dealt are fixed rules, there is no discretion for either the Player's hand or the Banker's hand on whether a third card is dealt.

If either the Player hand or the Banker hand has a point total of eight or nine on the first two cards, no third card is dealt to either hand and the hand with the highest point total is the winner (or the hand is a Tie, as the case may be). If neither the Player hand nor the Banker hand has a point total of eight or nine, then there is a possibility of a third card draw.

The third card draw rules are as follows:

Rule #1: If the initial two card Player hand has a point total of 0, 1, 2, 3, 4 or 5, the Player hand draws a third card. If the initial two card Player hand has a point total of 6 or 7, the Player hand stands and does not receive a third card.

Rule #2: If the Player hand stands and does not draw a third card, then the Banker hand follows Rule #1. In other words, if the Player hand has a point total of 6 or 7, the Banker hand draws a third card on a point total of 0, 1, 2, 3, 4 or 5 and the Banker hand stands on a point total of 6 or 7.

Rule #3: If the Player hand draws a third card, the Banker hand must draw or stand as follows:

TABLE 1

| BACCARAT RULES | | |
|---|---|---|
| PLAYER | | |
| HAVING TWO CARD TOTAL OF | | |
| 1-2-3-4-5-10 | DRAWS A CARD | |
| 6-7 | STANDS | |
| 8-9 | TURNS CARDS OVER | |
| BANKER | | |
| HAVING TWO CARD TOTAL OF | DRAWS WHEN GIVING OR PLAYER'S THIRD CARD DRAW IS AN | DOES NOT DRAW WHEN GIVING OR PLAYER'S THIRD CARD DRAW IS AN |
| 0, 1, 2 | ALWAYS DRAWS | |
| 3 | 1-2-3-4-5-6-7-9-10 | 8 |
| 4 | 2-3-4-5-6-7 | 1-8-9-10 |
| 5 | 4-5-6-7 | 1-2-3-8-9-10 |
| 6 | 6-7 | 1-2-3-4-5-8-9-10 |
| 7 | STANDS | |
| 8-9 | TURNS CARDS OVER | |

At the end of each hand, winning wagers are paid and losing wagers are collected by the house. Any commission due to the house is marked in commission boxes in the center of the table. Gaming chips are used to represent the amount of money owed by each bettor to the house for the commissions. In order not to slow down the game, the commission is not actually collected from each bettor until the end of the round determined by all of the cards in the shoe being dealt down to the plastic cut card, usually approximately eighty hands.

The mathematical analysis of the game reveals that the 5% commission is what gives the house its advantage on wagers on the Banker hand and allows the gaming establishment to make a profit from providing the Baccarat game to the bettors. Because the rules for standing and drawing third cards are automatic, the mathematical analysis shows that the Banker hand will win 45.859% of the hands, the Player hand will win 44.624% of the hands and the Tie hand will occur 9.517% of the hands. If the Tie hands are disregarded because they do not affect any Player or Banker wagers, it is then determined that the Banker hand will win 50.7% of the time and the Player hand will win 49.3% of the time.

Because the Banker hand wins more than 50% of the hands (disregarding the Tie hands that do not affect any Player or Banker wagers), if a bettor always bet on the Banker hand, the bettor would have an advantage over the gaming establishment. By charging a 5% commission on all Banker hand wins, the gaming establishment compensates for the percentage of winning Banker hands being slightly over 50%.

After figuring in the 5% commission that must be paid by bettors on winning Banker hands, the gaming establishment has approximately a 1.23% advantage over the bettor when the bettor wagers on the Player hand and the gaming establishment has a 1.057% advantage over the bettor when the bettor wagers on the Banker hand. The Tie hand wager gives the gaming establishment a 4.88% advantage over the bettor when the payoff odds are nine-to-one and a 14.1% advantage over the bettor when the payoff odds are eight-to-one.

Because of the limited number of playing cards provided in baccarat, it has been difficult to design jackpots and progressive jackpots with a balance between sufficiently high hit frequency and sufficiently high jackpots that will maintain the interest of players.

U.S. Pat. No. 5,275,411 (Breeding) discloses a position of start indicator for Pai Gow poker games where a hand-position for first hands dealt is randomly indicated by a 7-segment display for positions 1-7. All references to Patent Documents made herein are incorporated by reference in their entirety.

SUMMARY OF THE INVENTION

A system enables a method of executing a game of baccarat with a side bet event. The system includes a gaming table with at least two distinct player positions. The gaming table having positions thereon for placing an initial wager on the game of baccarat and for placing a second wager on the side bet event from at least one of at least two player positions at the gaming table on the game of baccarat, the side bet resolved by final playing cards at the player hand position and the banker hand position. Each of the at least two player positions has a secondary random outcome indicator display. The gaming table has a random event generator providing distinct random event outcome indicators to the secondary random outcome indicator displays at each player position and each distinct random event outcome indicator represents a single digit number value.

BRIEF DESCRIPTION OF THE FIGURES

FIG. 1 shows an exploded side view perspective of a system according to the present invention.

DETAILED DESCRIPTION OF THE INVENTION

A method executes a game of baccarat with a side bet event. The game of baccarat may be a standard or variant game of baccarat in which a player hand of playing cards is in competition with a banker hand of playing cards. A player hand position and a banker hand position receive playing cards from at least one randomized deck of 52 playing cards. The method may include:

placing of an initial wager from at least one of at least two player positions at a gaming table on the game of baccarat;

the at least one player position placing a second wager on a side bet event resolved by using final playing cards dealt to the player hand position and final playing cards dealt to the banker hand position;

providing each of the at least two player positions with a secondary random outcome indicator display;

a random event generator providing distinct random event outcome indicators to the secondary random outcome indicator displays at each of the at least two player positions;

The indicator displays may be any component or system that is visually (or even electronically) readable. This may include 7-segment displays, nine bulbs, an image panel (with LED, Liquid Crystal, plasma, analog or digital displays), or any other system. The nature of the image may be common Arabic numerals, Roman, numerals, numbers of dots or dashes, card symbols, animals, etc. Anything that indicates a single digit value in the display will suffice.

Each distinct random event outcome indicator represents a single digit number value selected from the group consisting of 0, 1, 2, 3, 4, 5, 6, 7, 8 and 9; It is possible to use fewer numbers so as to remove the impact of some ties (e.g., remove 0 as an indicator so that zero ties are never a Golden Tie. In doing so, a "blank" indicator may be provided to a player position in place of the 0 to assure that all available indicators matching the single digits are available.)

At the conclusion of providing the final hands of playing cards to the player hand position and the banker hand position:

resolving the initial wager according to standard rules of baccarat; and resolving the second wager at the at least one player position as a highest winning outcome when a single digit point count according to rules of baccarat in the final banker hand equals a single digit point count according to rules of baccarat in the final player hand and the single digit number value at one of the at least two player positions represented by the distinct random event outcome indicator is also equal to the single digit point count according to rules of baccarat in the final player hand.

The random event outcome indicator comprises a random number generator or random event generator that provides equally weighted distinct indications on individual displays at each of the at least two player positions of single digit point counts selected from the group consisting of 0, 1, 2, 3, 4, 5, 6, 7, 8, and 9. The numbers may be randomly weighted also, so as to make ties in some numbers more valuable than ties in other numbers, such that a 0-Tie is low or no value, 9-Ties are next in value, 8-Ties highest values, and 1-, 2-, 3, 4-, 5-, 6- and 7-Ties have intermediate values. The random event generator may also be a combination of a template of total table displays and a random number generator, or may be a provided, ordered or unordered set of templates. For example, there could be many different available templates (e.g., 8 factorial times 10) for the distribution of the 10 possible tie outcomes at each player position. Each template within the total collection of templates would assign a specific tie-number value to each player position such that within the total of templates, all possible distributions of the tie-values are represented. The templates may be preordered (that is a memory may have the templates provided in an order of selection, even though the relations of successive templates are random, or a random number generator may select individual ones of the templates randomly. In any event, all of these technologies are included within the scope of the recitation of "a random event generator providing distinct random event outcome indicators to the secondary random outcome indicator displays at each of the at least two player positions . . . ."

Templates have been used in the art for provision of complete game outcomes, as shown in U.S. Pat. No. 6,159,096 (Yoseloff), but have not been used for technology such as the present invention where an actual outcome on the gaming event is not being provided. That patent is incorporated by reference in its entirety herein.

Similar to, but not the same as a template would be for the random number generator to use a single player position as a primary position for determining which number-ties apply to all hands. For example, the third player position may be the focus of a random number generator, and when one of the random numbers (e.g., 4) is selected for that third player position, player positions to the left or right of the third player's position may have numbers for the ties decrease in order (e.g., 3, 2, 1, 0, 9 . . . ) or increase in order (5, 6, 7, 8 . . . ). Thus, determination of a random value for one specific position will provide a determination (in ascending or descending order) for all other player positions.

Additionally, when one player position tie-number is selected, random templates may be selected for determining all other player position tie numbers. Thus, if the third player position (counting left to right from the last position on the table with eight player positions on the table) received a random selection of a tie value of 2, any template fitting the pattern of a, b, c, d, e, 2, g and h, wherein a, b, c, d, e, g and h are exclusively selected from the group consisting of 1, 3, 4, 5, 6, 7, 8, 9 and 0) may be imposed on the table for positioning of individual and collective player position tie-values.

It is felt that numbers should be displayed at each player position, whether or not the side bet wager is placed, as this can influence a player to later make the wager when that player sees how many winning outcomes on the wager that position will have missed because of failure to make the side bet wager. Alternatively, only player positions where the side bet wager has been made may be provided with the display of a random number to facilitate dealer/banker resolution of wagers and remove the need for all player positions to be examined for the winning outcome, but rather only player positions having made the wager with the symbol illuminated for the player position tie value.

The description that the secondary random event indicators (indicating the tie-values) are displayed "at each hand" does not require that the indicators be physically located at each player position. Rather, any system that indicates visually to the player that various values are independently provided at each player position may be provided by a screen behind the banker, showing the tie values at each player position may be used, as well as any other visual display system that can provide at least displays of tie-values at each player position to that player position.

The random event outcome indicator comprises a random number generator generally provides equally weighted distinct indications on individual displays at each of the at least two player positions of single digit point counts selected from the group consisting of 0, 1, 2, 3, 4, 5, 6, 7, 8, and 9, and/or the random event outcome indicator has a random number generator that provides equally weighted distinct indications on a single display panel visible to each of the at least two player positions of single digit point counts selected from the group consisting of 1, 2, 3, 4, 5, 6, 7, 8, and 9 or 0, 1, 2, 3, 4, 5, 6, 7, 8, and 9 that are randomly generated to each individual one of the at least two player positions without repetition of any of the single digit point counts.

By using the display system for ties at individual player positions, the method may use the second wager as a progressive jackpot wager.

A system for enabling a method of executing a game of baccarat with a side bet event. The game of baccarat may include a player hand of playing cards in competition with a banker hand of playing cards. A player hand position and a banker hand position receive playing cards from at least one randomized deck of 52 playing cards. The system may include:

the system including a gaming table with at least two distinct player positions at the gaming table;

the gaming table having positions thereon for placing an initial wager from at least one of at least two player positions at the gaming table on the game of baccarat;

the gaming table having positions thereon for placing a second wager on a side bet event from at least one of at least two player positions at the gaming table on the game of baccarat resolved by using final playing cards dealt to the player hand position and final playing cards dealt to the banker hand position;

each of the at least two player positions has a secondary random outcome indicator display;

the gaming table associated with a random event generator providing distinct random event outcome indicators to the secondary random outcome indicator displays at each of the at least two player positions; and each distinct random event outcome indicator representing a single digit number value selected from the group consisting of 0, 1, 2, 3, 4, 5, 6, 7, 8 and 9.

The system may enable the random event outcome indicator comprises a random number generator that provides equally weighted distinct indications on a single display panel visible to each of the at least two player positions of single digit point counts selected from the group consisting of 1, 2, 3, 4, 5, 6, 7, 8, and 9 that are randomly generated to each individual one of the at least two player positions without repetition of any of the single digit point counts, or the random event outcome indicator comprises a random number generator that provides equally weighted distinct indications on a single display panel visible to each of the at least two player positions of single digit point counts selected from the group consisting of 0, 1, 2, 3, 4, 5, 6, 7, 8, and 9 that are randomly generated to each individual one of the at least two player positions without repetition of any of the single digit point counts. The system may enable the second wager as a progressive jackpot wager and there is an automated accounting system in communication with the positions on the gaming table for placing the second wager.

The general technology is for a Baccarat Progressive Game for all formats of Baccarat (Live, ETG, Virtual, Online, and Mobile apps) which Applicant refers to as the "GOLDEN TIE."

A common problem with Baccarat Progressives is that since Baccarat is a community game, the combinations of cards in the hand that trigger a progressive jackpot do so for all of the players participating, and the players therefore have to split the progressive.

This progressive system enables there to be one unique progressive winner when a particular series of cards is dealt and there are 10 or fewer players participating in the progressive wager.

Before each new hand of baccarat is dealt, this progressive system randomly generates a number from 0 to 9 for each participating player (can display it on sign or anywhere on table etc. . . . on player station or sign for ETG, mobile device or tablet or player station or table for virtual or online game . . . it doesn't matter where it is displayed).

If there are 10 or less players, each player position receives an equally weighted random number from 0 to 9 . . . no 2 players are assigned the same number. So for example if there are exactly 10 players participating in the progressive, each player will receive a number from 0 to 9 (no 2 players will have the same number.) In an alternate version each player can receive a randomly generated number from 0 to 9 and players might have the same randomly generated number. In an alternate version, each player at the table or playing the baccarat game (ETG, Virtual, Online) may be randomly assigned a number from 0 to 9 (Even if they are not participating in the progressive game).

If there are between 11-20 players participating in the progressive, then the first 10 player positions receive an equally weighted random number from 0-9 (no 2 players of the first group of 10 have the same number), and then the remaining 1 to players are assigned an equally weighted number from 0-9 (no duplicates).

This process is repeated for each multiple of 10 players participating in the progressive game.

The progressive game is based on TIES occurring during the main game of Baccarat.

Specifically the pay tables described below WIN when 6 CARD TIES are dealt during the main game of Baccarat (The SIX cards represent 3 Banker Cards being dealt and 3 Player Cards being dealt according to the commonly accepted rules of Baccarat). This can alternatively be done with pay tables including one or more of 4 card ties and 5 card ties in addition to 6 card ties.

The Pay Tables illustrate some examples of different conditions to win and some sample pay outs when that condition is won. The game is preferably played with ONLY six card counts used in the outcome, but variants may be used where only 4-card ties are used, only 5-card ties are used, or any combination of 4-card, 5-card and 6-card (the maximum cards allowable in baccarat) ties may be used, varying the paytable.

Some of the pay lines, and in Particular the Progressive Jackpot, are won when at a minimum a six card tie is dealt and the point total of the tie (according to the common scoring system of baccarat) matches the Number (0-9) that is generated and assigned to the participating progressive player.

GOLDEN TIE ™ PROGRESSIVE SAMPLE 1

| HAND | COMB | PROB | Pay Table | Return |
|---|---|---|---|---|
| 6 CARD TIE-SUITED + GOLD # | 14,303,277,327 | 0.00000286 | 100% | |
| 6 CARD TIE-SUITED | 128,729,495,943 | 0.00002575 | 1000 for 1 | 0.025754 |
| 6 CARD TIE-COLORED + GOLD# | 478,597,186,296 | 0.00009575 | 500 for 1 | 0.047875 |
| 6 CARD TIE-COLORED | 4,307,374,676,663 | 0.00086175 | 100 for 1 | 0.086175 |
| 6 CARD TIE + GOLD # | 15,866,942,169,312 | 0.00317441 | 50 for 1 | 0.158720 |
| 6 CARD TIE-ANY | 142,802,479,523,803 | 0.02856965 | 10 for 1 | 0.285696 |
| Total: | 4,998,398,275,503,360 | 0.03273017 | | |

GOLDEN TIE ™ PROGRESSIVE SAMPLE 2

| HAND | COMB | PROB | Pay Table | Return |
|---|---|---|---|---|
| 6 CARD TIE-GOLD # + SUITED | 14,303,277,327 | 0.00000286 | 100% | |
| 6 CARD TIE-SUITED | 128,729,495,943 | 0.00002575 | 1000 for 1 | 0.025754 |
| 6 CARD TIE-GOLD # + COLORED | 478,597,186,296 | 0.00009575 | 500 for 1 | 0.047875 |

-continued

| GOLDEN TIE ™ PROGRESSIVE SAMPLE 2 | | | | |
|---|---|---|---|---|
| HAND | COMB | PROB | Pay Table | Return |
| 6 CARD TIE-COLORED | 4,307,374,676,663 | 0.00086175 | 200 for 1 | 0.172350 |
| 6 CARD TIE-GOLD # | 15,866,942,169,312 | 0.00317441 | 50 for 1 | 0.158720 |
| 6 CARD TIE-ANY | 142,802,479,523,803 | 0.02856965 | 5 for 1 | 0.142848 |
| Total: | 4,998,398,275,503,360 | 0.03273017 | | |

| GOLDEN TIE ™ PROGRESSIVE SAMPLE 3 | | | | |
|---|---|---|---|---|
| HAND | COMB | PROB | Pay Table | Return |
| 6 CARD TIE-GOLD # + DIAMONDS | 3,575,819,332 | 0.00000072 | 100% | |
| 6 CARD TIE-GOLD # + SUITED | 10,727,457,995 | 0.00000215 | 10% | |
| 6 CARD TIE-SUITED | 128,729,495,943 | 0.00002575 | 750 for 1 | 0.019316 |
| 6 CARD TIE-GOLD # + COLORED | 478,597,186,296 | 0.00009575 | 500 for 1 | 0.047875 |
| 6 CARD TIE-COLORED | 4,307,374,676,663 | 0.00086175 | 200 for 1 | 0.172350 |
| 6 CARD TIE-GOLD # | 15,866,942,169,312 | 0.00317441 | 50 for 1 | 0.158720 |
| 6 CARD TIE-ANY | 142,802,479,523,803 | 0.02856965 | 5 for 1 | 0.142848 |
| Total: | 4,998,398,275,503,360 | 0.03273017 | | |

| GOLDEN TIE ™ PROGRESSIVE SAMPLE 4 | | | | |
|---|---|---|---|---|
| HAND | COMB | PROB | Pay Table | Return |
| 6 CARD TIE-GOLD # + SUITED | 14,303,277,327 | 0.00000286 | 100% | |
| 6 CARD TIE-SUITED | 128,729,495,943 | 0.00002575 | 1000 for 1 | 0.025754 |
| 6 CARD TIE-GOLD # + COLORED | 478,597,186,296 | 0.00009575 | 500 for 1 | 0.047875 |
| 6 CARD TIE-COLORED | 4,307,374,676,663 | 0.00086175 | 100 for 1 | 0.086175 |
| ANY TIE-GOLD # | 44,055,348,434,892 | 0.00881389 | 25 for 1 | 0.220347 |
| ANY TIE | 396,498,135,914,026 | 0.07932504 | 3 for 1 | 0.237975 |
| Total: | 4,998,398,275,503,360 | 0.08912505 | | |

| GOLDEN TIE ™ SIDE BET SAMPLE | | | | |
|---|---|---|---|---|
| HAND | COMB | PROB | Pay Table | Return |
| ANY TIE-GOLD# + SUITED | 329,872,052,163 | 0.00006600 | 1000 | 0.065996 |
| ANY TIE-SUITED | 2,968,848,469,464 | 0.00059396 | 200 | 0.118792 |
| ANY TIE-GOLD # + COLORED | 3,177,522,160,267 | 0.00063571 | 100 | 0.063571 |
| ANY TIE-COLORED | 28,597,699,442,405 | 0.00572137 | 50 | 0.286069 |
| ANY TIE-GOLD# | 44,055,348,434,892 | 0.00881389 | 10 | 0.088139 |
| ANY TIE | 396,498,135,914,026 | 0.07932504 | 3 | 0.237975 |
| NOTHING | 4,522,770,849,030,140 | 0.90484403 | −1 | (0.904844) |
| Total: | 4,998,398,275,503,360 | 1.00000000 | EDGE: | (0.044303) |

The above paytables are example of paytables that may be used in the practice of the present technology and are not intended to limit the scope of the generic invention described herein.

Although a preferred system for practice of the technology is a felt-type game, with physical playing cards or electronic playing cards used on a typical playing card gaming table structure, the system may be used in purely electronic gaming tables, multiplayer console formats, video electronic gaming formats, on internet gaming play, through hand-held devices and the like. Enablement of these formats for playing card games is known in the art with commercial and disclosed systems available for transposing the physical table game system into these electronic wagering formats. Such variations in format are disclosed, for example, in US Published Application Document No. 20070298854 (DUNN), which is incorporated herein by reference.

The system may have all ties (0-9) available, or exclude one or more specific tie-numbers, such as excluding tie-4s in certain markets where the number four (4) is felt to be unlucky. Any combination of numbers between 0-9 may be used and any numbers excluded.

FIG. 1 shows an exploded perspective of a system according to the present invention. FIG. 1 shows a gaming table system 500 including a secondary random event generator 526. The gaming table system 500 is shown with a physical support 502 and a gaming table top 504. The support 502 has a side 512 facing the dealer (not shown) and an upper game table surface 508. The upper game table surface 508 carries the secondary random number generator and any included circuitry 516 necessary for relaying the secondary random number generator events. The circuitry connection 526 is integrated or not into the system 500. The secondary random number generator and any included circuitry 516 is shown to be wired to separate and distinct individual player position visual output devices 518*a*, 518*b*, 518*c* and 518*d* by individual wires 517 to form a secondary random event generation component 506 which includes all elements of 516, 517, 518*a-d* and 526.

The gaming table top 504 is supported under the surfaces 510 of the gaming table top 504 and the base support layer 502 which has a side facing 512 facing the dealer (not shown) and an upper support surface 508. The separate and distinct individual player position visual output devices 518*a*, 518*b*, 518*c* and 518*d* are exposed through holes or openings 520*a*, 520*b*, 520*c* and 520*d* in the gaming table cover layer 504. Each separate and individual player position is also shown with a side bet or jackpot bet sensing/entering input system as 530*a*, 530*b*, 530*c* and 530*d*, respectively. An alternative construction may include a communication port 524 in linked communication path 522 to an individual opening (520*c*) as by a further direct connecting port 528 to each separate and distinct individual player position visual output devices 518*a*, 518*b*, 518*c* and 518*d*.

Other variants and modifications are within the generic scope of the present invention and are within the scope of the appended claims of this Application.

What is claimed:

1. A system for enabling a method of executing a game of baccarat with a side bet event, the game of baccarat comprising a player hand of playing cards in competition with a banker hand of playing cards, a player hand position and a banker hand position receiving playing cards from at least one randomized deck of playing cards, the system comprising:

a gaming table with a plurality of player positions, a player position of the plurality of player positions including a first wager position and a second wager position, the first wager position being configured to receive a first wager and the second wager position being configured to receive a second wager, the second wager being associated with a side bet event resolved by using playing cards dealt to the player hand position and playing cards dealt to the banker hand position in the game of baccarat, wherein the side bet event is determined by a final result in the game of baccarat of a tie and a numerical value of the tie in the final result in the game of baccarat;

a random event generator associated with the gaming table, the random event generator being configured to randomly generate a single digit from the group consisting of 0, 1, 2, 3, 4, 5, 6, 7, 8 and 9, the single digit being associated with the player position in the game of baccarat by a random event generator outcome indicator responsive to receiving the second wager in the second wager position, wherein the single digit generated by the random event generator is generated without repetition for the plurality of player positions in the round of the game of baccarat, and wherein the random event generator outcome indicator is configured to actuate a display of the single digit being associated with the player position; and an automated accounting system configured to receive the final result of the tie in the game of baccarat and the numerical value of the tie in the final result, and responsive thereto, determine a payout amount to distribute to said each player position, the payout amount being determined by the automated accounting system as one of either a (i) first payout amount, the determination of the first payout amount by the automated accounting system being responsive to the numerical value of the tie in the final result being the same as the single digit being associated with the player position or (ii) a second payout amount, the determination of the second payout amount by the automated accounting system being responsive to the numerical value of the tie being different than the single digit being associated with the player position, wherein the first payout amount is greater than the second payout amount.

2. The system of claim 1 wherein the first wager is associated with an outcome determined based on a final result of the round of the game of baccarat.

3. The system of claim 1 wherein the random event generator outcome indicator comprises at least two distinct display panels in communication with the random event generator, wherein each display panel of the at least two distinct display panels is mounted at each player position of the at least two distinct player positions.

4. The system of claim 1 wherein the random event generator outcome indicator comprises a device for displaying an image of the single digit being associated with the player position.

5. The system of claim 1, wherein the random event generator outcome indicator comprises a display device in communication with the random event generator, the display device presenting the single digit being associated with the player position.

6. The system of claim 1, wherein the second wager comprises a progressive jackpot wager and the automated accounting system is in communication with the second wager position of the plurality of player positions on the gaming table.

7. The system of claim 1 wherein the second wager comprises a progressive jackpot wager and the automated accounting system is in communication with the second wager position of the plurality of player positions on the gaming table, the automated accounting system being configured to associate the player position with receiving the second wager.

8. The system of claim 1 further comprising at least one sensor in communication with the automated accounting system configured to detect the second wager being received at the second wager position of the player position and associate the player position with the single digit.

9. A system for enabling a method of executing a game of baccarat with a side bet event, the game of baccarat comprising a player hand of playing cards in competition with a banker hand of playing cards, a player hand position and a banker hand position receiving playing cards from at least one randomized deck of playing cards, the system comprising:

a gaming table with a player position;

the gaming table having an initial wager position defined thereon for receiving an initial wager;

the gaming table having a second wager position defined thereon for receiving a second wager on a side bet event, wherein the side bet event is determined by a final result of a tie and a numerical value of the tie in the game of baccarat;

a secondary random event outcome generator in communication with a secondary random event outcome indicator, the secondary random event outcome indicator being configured to display a single digit number value randomly selected by the secondary random event outcome generator from the group consisting of only 0, 1, 2, 3, 4, 6, 7, 8 and 9; and an automated accounting system configured to receive the final result of the tie and the numerical value of the tie in the game of baccarat, and responsive thereto, (i) associate the single digit number value randomly selected with the player position responsive to receiving the second wager at the second wager position, (ii) determine a payout amount to distribute to each player position of the at least two player positions associated with the placing of second wager, the payout amount being determined by the automated accounting system as one of a first payout amount responsive to the automated accounting system determining that the numerical value of the tie and the single digit number value are the same and a second payout amount responsive to the automated accounting system determining that the numerical value of the tie is different than the single digit number value selected, wherein the first payout amount is greater than the second payout amount.

10. The system of claim 9 wherein the secondary random event outcome indicator comprises a device in communication with the secondary random event generator, the secondary random event outcome indicator being configured to provide a visual display of only equally weighted single digit numbers selected from the group consisting of only numbers 0, 1, 2, 3, 4, 5, 6, 7, 8, and 9.

11. The system of claim 9 wherein the second wager comprises a progressive jackpot wager and the automated accounting system is in communication with a bet sensor associated with the second wager position, the bet sensor sensing the receiving of the second wager.

12. A method of executing a round of a game of baccarat with a side bet event, the game of baccarat comprising a player hand of playing cards in competition with a banker hand of playing cards, a player hand position and a banker hand position receiving playing cards from at least one randomized deck of playing cards, the method comprising the steps of:

detecting receipt of a second wager at a second wager position defined on a gaming table having a player position, wherein the second wager position includes a bet sensor configured to detect receipt of a second wager, the second wager having an outcome determined by the final result of a tie in the round of the game of baccarat;

responsive to the bet sensor detecting receipt of the second wager, actuating a random outcome generator configured to randomly generate a secondary random event outcome, wherein the secondary random event outcome is a single digit value selected from the group consisting only of numbers 0 1, 2, 3, 4, 5, 6, 7, 8, and 9 without repetition;

responsive to the random outcome generator randomly generating a single digit value as the secondary random event outcome, an accounting system in communication with the random outcome generator causing a display of the randomly generated single digit value at a secondary random outcome indicator display at the gaming table; and responsive to a communication of the final result of a tie in the round of the game of baccarat, the accounting system determining one of a first payout amount and a second payout amount for distribution to the player position, the first payout amount being greater than the second payout amount, wherein the first payout amount is determined for distribution to the player position associated with the display of a randomly generated single digit value matching the numerical value of the tie, and the second payout amount is determined for distribution to the player position associated with the display of a randomly generated single digit value that is different from the numerical value of the tie.

13. The method of claim 12, wherein the final result of a tie in the round of the game of baccarat communicated to the accounting system further comprises identifying the playing cards forming the player hand and the banker hand in the round of the game of baccarat.

* * * * *